Patented May 7, 1929.

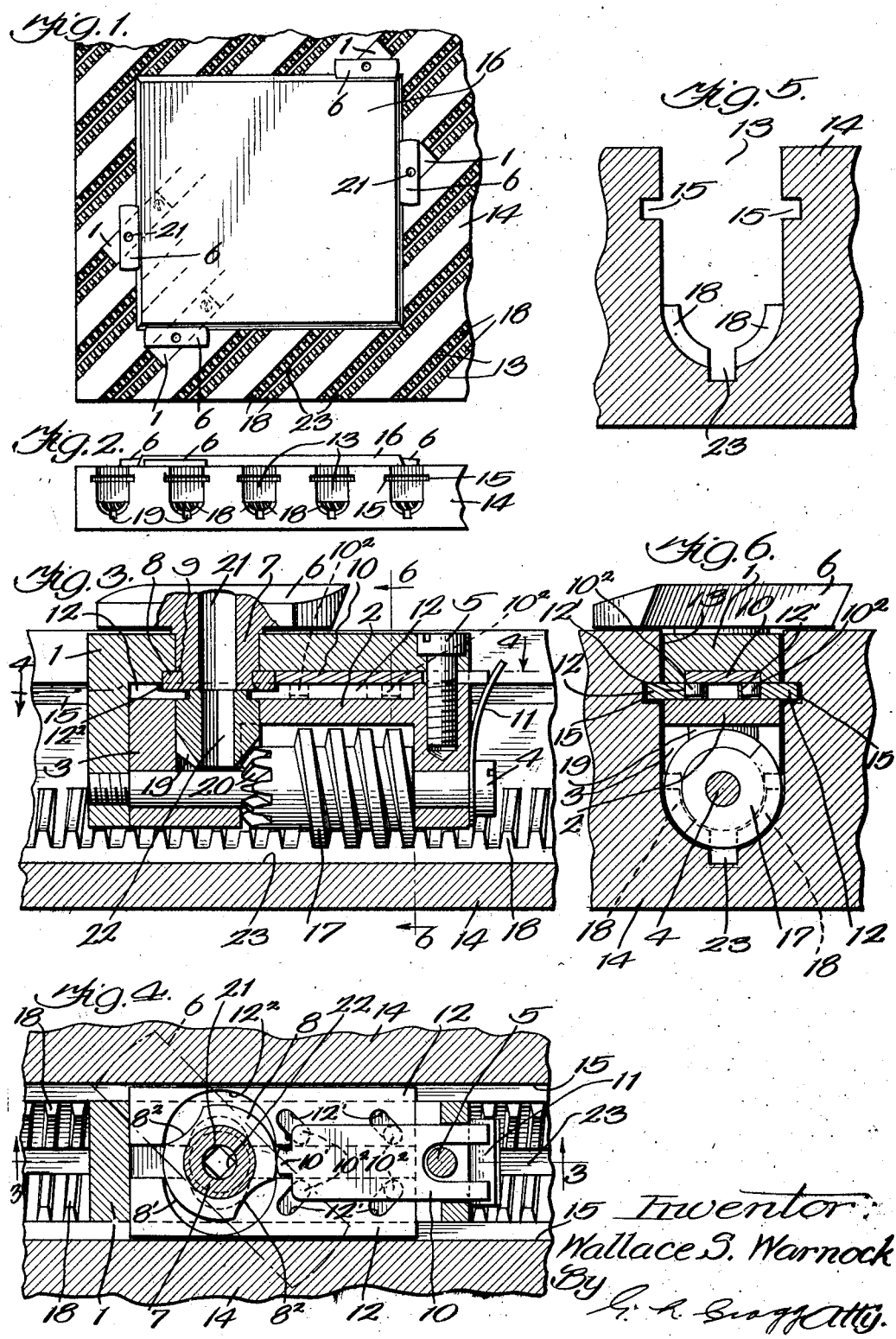

1,711,509

UNITED STATES PATENT OFFICE.

WALLACE S. WARNOCK, OF CHICAGO, ILLINOIS.

PRINTING-PRESS BED.

Original application filed August 10, 1927, Serial No. 212,081. Divided and this application filed February 27, 1928. Serial No. 257,406.

My invention relates to beds either of the flat or rotary type for supporting and holding printing plates or forms and particularly to those beds which are provided with grooves that receive the base portions of form or plate engaging clamps that are commonly termed "register hooks" and which grooves contain elongated gears which cooperate with gear elements upon the bodies of the clamps or register hooks whereby such clamps or register hooks may be caused to travel in the grooves to bring the clamping jaws thereof into or out of engagement with the plates or forms upon the beds. The present application is a division of my original application, Serial No. 212,081, filed Aug. 10, 1927.

Much difficulty has been found in connection with plate supporting beds of this character due to the foreign matter which falls into the grooves and is apt to become permanently lodged in the gears that are within the grooves owing to the oily and gummy nature of the dirt which is usually found in printing presses. The gears within the grooves have hitherto usually been in the form of racks which were fixed centrally within the bottoms of the grooves and directly in position to receive and hold the foreign matter dropping into the grooves.

In accordance with my invention, the fixed gears in the grooves are inclined, there being preferably two such inclined gears in each groove which are spaced apart laterally of the groove to afford spacing extending longitudinally of the groove within which the foreign matter may be received, this spacing desirably continuing vertically below the fixed gears to afford ample clearance between the lodged foreign matter and the gears upon the bodies of the clamps which cooperate with the fixed gears in the grooves. In the preferred embodiment of the invention, the crowns of the gear teeth are helically inclined to constitute segments of worm teeth and the two gears match so that the teeth of each are, in effect, spiral continuations of the teeth of the other.

The invention will be more fully explained in connection with the accompanying drawing in which Fig. 1 is a plan view of a portion of a flat plate of form supporting bed, a plate being indicated upon the bed, register hooks being also illustrated for holding the plate in position; Fig. 2 is a side view of the structure shown in Fig. 1; Fig. 3 is a sectional view taken through and along one of the grooves and also illustrating a plate clamping structure; Fig. 4 is a sectional view on line 4—4 of Fig. 3; Fig. 5 is a cross sectional view of a portion of the bed; and Fig. 6 is a sectional view on the line 6—6 of Fig. 3.

The body of the clamp illustrated is composed of an L-shaped member 1 and a U-shaped member 2 one of whose sides 3 engages the upright side of the member 1. An assembling bolt 4 passes through the ends of the U-shaped member 2 and is threaded into the upright side of the L-shaped member 1. Another assembling bolt or screw 5 passes through the outer end of the top side of the L-shaped member 1 and enters the U-shaped member 2, this bolt being threaded into said U-shaped member. The work engaging jaw 6 is formed with a stem 7 which is journaled in the top side of the clamp body 1. A cam 8 is fastened upon the lower end of the stem 7, this cam constituting a flange whose upper face is in contact with the lower face of the top side of the body member 1, said cam being positioned by a shoulder 9 upon the stem 7. Such lower face of this body member is raised a depth less than the thickness of said cam and just sufficient to snugly receive the adjusting plate 10 which is slidable longitudinally of the clamp body. This plate is pressed upon by a leaf spring 11 which is clamped by the head of the bolt 4 against the clamp body. The spring serves to maintain the reduced end 10' of the plate 10 in engagement with the cam 8. Said cam has two diametrically opposite arcuate dwells 8' that are coaxial with the jaw stem 7. It also has two diametrically opposite concave actuating portions 8² that are located between the parts 8'. When either of the dwells 8' engages the plate portion 10', the plate 10 is thrust outwardly from the axis of the jaw 6 against the force of the spring 11 and when either cam portion 8² receives the plate portion 10', the plate 10 is moved toward the stem of the jaw by the spring 11 to the extent permitted by the cam.

The adjusting plate 10 is formed with depending fingers 10² that enter the slots or recesses 12' in the retaining plates 12 which are employed to hold the body of the clamp within the groove 13 of the bed or form support 14, the plates 12 being movable transversely of the clamp body and being projectable laterally thereof at their longitudinal sides in order that they may serve to hold the clamp in assembly with the bed. The upper sides of said retaining plates 12 are formed with recesses 12² which receive the arcuate portions 8' of the cam 8 whereby said plates are prevented from being moved lengthwise of the clamp body. The slots or recesses 12' in each retaining plate 12 are slanted as illustrated whereby the adjusting plate 10 has wedging engagement with the retaining plates. When the jaw 6 is placed lengthwise of the clamp body, the cam portions 8² are positioned so that one of them fully receives the adjusting plate portion 10', the wedging fingers 10² then causing the retaining plates to move together to bring the outer longitudinal edges of these plates flush with the sides of the clamp body. When these retaining plates are thus drawn inwardly toward each other, the clamp body may be inserted into the selected one of the parallel grooves 13 formed in the bed support 14, this groove being of just such depth as to bring the plates 12 into the plane of the slots 15 formed in the sides of the groove 13, these slots being just of sufficient depth to snugly receive the outer longitudinal sides of these plates when the jaw 6 is turned into a plate holding position, the jaw, in being brought into its plate holding position, forcing the adjusting plate 10 outwardly until its cam engaging portion 10' is engaged by one of the dwells 8'. The plate holding jaw 6 is then held from vertical displacement and close to the work support 14 to take part in holding the plate or work 16 close upon its support.

The clamping device is also adjustable in the groove 13 that receives it so that its location may be readily changed to suit the location of the printing element 16. The clamping device illustrated includes a worm screw 17 which coacts with elongated fixed gears 18 in the bottom of the corresponding groove, these gears 18 being hereinafter more fully described. The worm screw 17 is mounted upon the stem of the bolt 4 and is free to turn on and with respect to said bolt stem, said worm screw being in thrusting relation to the body of the clamp so that when the screw is turned the clamp will be forced to move along the groove in which its body is received. Said screw is turned by means of two intermeshing bevel pinions 19 and 20, the pinion 19 being housed by the body member 2 and rotatable therein while the pinion 20 is directly formed upon the body of the screw 17. The pinion 19 is coaxial with the jaw stem 7. Said jaw stem is provided with a cylindrical bore 21 while the pinion 19 is provided with a square bore 22 that is in alignment with the bore 21. A square wrench may be passed through the bore 21 into the bore 22 in order to turn the pinion 19 to turn the screw 17 and force or effect the travel of the clamp.

In the use of the clamping device, the body thereof is placed in the groove 13 that receives it in close proximity to the work that is to be held, the actual clamping engagement of the clamping jaw with the work being effected by turning the screw 17 in the manner described.

Each of the two gears 18 in the bottom of each groove 13 is somewhat in the form of a rack, being constituted of a row of teeth which are in fixed relation to the bed 14 and which may be cast integrally with such bed if desired. The teeth of each of the two gears 18 are helically inclined and have their crowns curved upon an axis extending along the groove, the teeth of each of two fixed gears in a groove being spirally aligned with the teeth of the other fixed gear so that the teeth of each gear are, in effect, continuations of the teeth of the other. In other words, the gears 18 are of arcuate curvature, the gears having a common center or axis of curvature which is coincident with the axis of the worm 17. The thread of the worm 17 is thus placed in very intimate contact with the teeth of the gears 18, the engagement of the worm thread with the teeth of the gears 18 being full throughout the arcuate lengths of said gear teeth. The two gears 18 are spaced apart by a spacing 23 which is desirably at the middle of the bottom of the corresponding groove 13 and which is desirably continued downwardly beyond the gears 18. The two gears 18 are inclined so that there is a tendency for the dirt which is received between the teeth thereof to drop into the space 23. The worm 17 will also dislodge the dirt between the teeth 18 and force it into the bottom of the space 23. A cleaning tool may be readily passed along the spaces 23 that extend along the bottoms of the grooves.

Changes may be made without departing from the invention.

Having thus described my invention, I claim:

1. A printing bed having a groove formed therein for receiving the body portion of a plate engaging clamp, in combination with two elongated gears fixed in the bottom of said groove and each having helically inclined teeth that are curved upon an axis extending along the groove and spirally aligned with the teeth of the other gear, said gears being spaced apart at the bottom of and along the groove, the spacing between said gears being continued into the bed.

2. A printing bed having a groove formed therein for receiving the body portion of a plate engaging clamp, in combination with two elongated gears fixed in the bottom of said groove and each having helically inclined teeth that are curved upon an axis extending along the groove and spirally aligned with the teeth of the other gear, said gears being spaced apart at the bottom of and along the groove.

3. A printing bed having a groove formed therein for receiving the body portion of a plate engaging clamp, in combination with an elongated gear fixed in the bottom of said groove and inclining downwardly from one side of the groove and terminating short of the other side of the groove to afford a clearance for the reception of foreign matter, this clearance being continued into the bed.

4. A printing bed having a groove formed therein for receiving the body portion of a plate engaging clamp, in combination with an elongated gear fixed in the bottom of said groove and inclining downwardly from one side of the groove and terminating short of the other side of the groove to afford a clearance for the reception of foreign matter.

In witness whereof, I hereunto subscribe my name.

WALLACE S. WARNOCK.